US008942619B2

(12) United States Patent
Hasesaka et al.

(10) Patent No.: US 8,942,619 B2
(45) Date of Patent: Jan. 27, 2015

(54) RELAY DEVICE

(75) Inventors: Kiyomi Hasesaka, Kawasaki (JP);
Takuji Oyama, Kawasaki (JP);
Keiichiro Yamakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 13/605,346

(22) Filed: Sep. 6, 2012

(65) Prior Publication Data

US 2013/0059527 A1     Mar. 7, 2013

Related U.S. Application Data

(63) Continuation of application No. PCT/JP2010/001720, filed on Mar. 10, 2010.

(51) Int. Cl.
*H04B 7/15* (2006.01)
*H04L 12/66* (2006.01)
(Continued)

(52) U.S. Cl.
CPC ............ *H04L 12/66* (2013.01); *H04W 36/0066* (2013.01); *H04W 52/46* (2013.01); *H04W 28/0268* (2013.01); *H04L 47/2491* (2013.01);
(Continued)

(58) Field of Classification Search
CPC ............ H04W 36/0066; H04W 52/46; H04W 28/0268; H04L 12/66; H04L 12/6418; H04L 45/302; H04L 45/306; H04L 47/2491
USPC ............ 455/3.02, 7–9, 11.1, 12.1, 13.1, 13.2, 455/552.1, 422.1; 340/425.1; 370/226, 293, 370/274, 279, 315, 316, 492, 501
See application file for complete search history.

(56) References Cited

U.S. PATENT DOCUMENTS 6,678,341 B1 *  1/2004  Miyake et al. ................. 375/356
7,185,112 B1     2/2007  Kuranari et al.
(Continued)

FOREIGN PATENT DOCUMENTS

JP     2000-341343     12/2000
JP     2001-156838     6/2001
(Continued)

OTHER PUBLICATIONS

Translation of the International Preliminary Report on Patentability and Written Opinion of the International Searching Authority dated Oct. 2, 2012, from corresponding International Application No. PCT/JP2010/001720.

(Continued)

*Primary Examiner* — Dominic E Rego
(74) *Attorney, Agent, or Firm* — Katten Muchin Rosenman LLP

(57) ABSTRACT

A relay device includes a receiver, an information obtaining unit, a parameter storage unit, and a parameter setting unit, and relays a packet which is transmitted from a first network to a second network. The receiver receives the packet from the first network. The information obtaining unit obtains data type information for identifying a type of data which is transmitted and received by the packet. The parameter storage unit stores a control parameter which is used for controlling communication quality in the second network, so as to be associated with a type of transfer data indicating data transferred to the second network. The parameter setting unit sets to the packet the control parameter which is associated with transfer data of a same type as data identified by the data type information, and outputs the packet to which the control parameter is set to the second network.

7 Claims, 13 Drawing Sheets

(51) Int. Cl.
*H04W 36/00* (2009.01)
*H04W 52/46* (2009.01)
*H04W 28/02* (2009.01)
*H04L 12/857* (2013.01)
*H04L 12/64* (2006.01)
*H04L 12/725* (2013.01)

(52) U.S. Cl.
CPC .......... *H04L 12/6418* (2013.01); *H04L 45/306* (2013.01); *H04L 45/302* (2013.01)
USPC ............................ 455/11.1; 455/13.1; 455/16

(56) References Cited

U.S. PATENT DOCUMENTS

| | | | |
|---|---|---|---|
| 7,206,324 | B2 | 4/2007 | Persson et al. |
| 7,649,890 | B2 | 1/2010 | Mizutani et al. |
| 7,912,460 | B2 | 3/2011 | Takeda |
| 8,412,843 | B2 * | 4/2013 | Nakao et al. ................. 709/231 |
| 8,488,612 | B2 * | 7/2013 | Krantz et al. ............ 370/395.21 |
| 8,824,958 | B2 * | 9/2014 | Vainikka et al. ............. 455/11.1 |
| 2003/0208582 | A1 | 11/2003 | Persson et al. |
| 2004/0006573 | A1 * | 1/2004 | Takashi ...................... 707/104.1 |
| 2006/0187942 | A1 | 8/2006 | Mizutani et al. |
| 2006/0291417 | A1 * | 12/2006 | Aust et al. ..................... 370/331 |
| 2008/0117924 | A1 * | 5/2008 | Nakamura et al. ............ 370/401 |
| 2009/0017815 | A1 | 1/2009 | Takeda |
| 2009/0122707 | A1 * | 5/2009 | Weinman ...................... 370/237 |
| 2010/0062787 | A1 * | 3/2010 | Yoshiuchi et al. .......... 455/452.2 |
| 2011/0134882 | A1 * | 6/2011 | Aoyama et al. ............... 370/331 |

FOREIGN PATENT DOCUMENTS

| | | |
|---|---|---|
| JP | 2001-268112 | 9/2001 |
| JP | 2002-101126 | 4/2002 |
| JP | 2003-521137 | 7/2003 |
| JP | 2005-525023 | 8/2005 |
| JP | 2005-340922 | 12/2005 |
| JP | 2006-237678 | 9/2006 |
| JP | 2009-21759 | 1/2009 |
| WO | 00/64121 | 10/2000 |
| WO | 03/094447 | 11/2003 |

OTHER PUBLICATIONS

Notice of Rejection Ground dated Jun. 11, 2013, from corresponding Japanese Application No. 2012-504149.
International Search Report dated Apr. 6, 2010 for International Application No. PCT/JP2010/001720.
R. Fielding, et. al. "Hypertext Transfer Protocol—HTTP/1.1", Network Working Group Request for Comments: 2616, rfc2616.txt, Jun. 1999.

\* cited by examiner

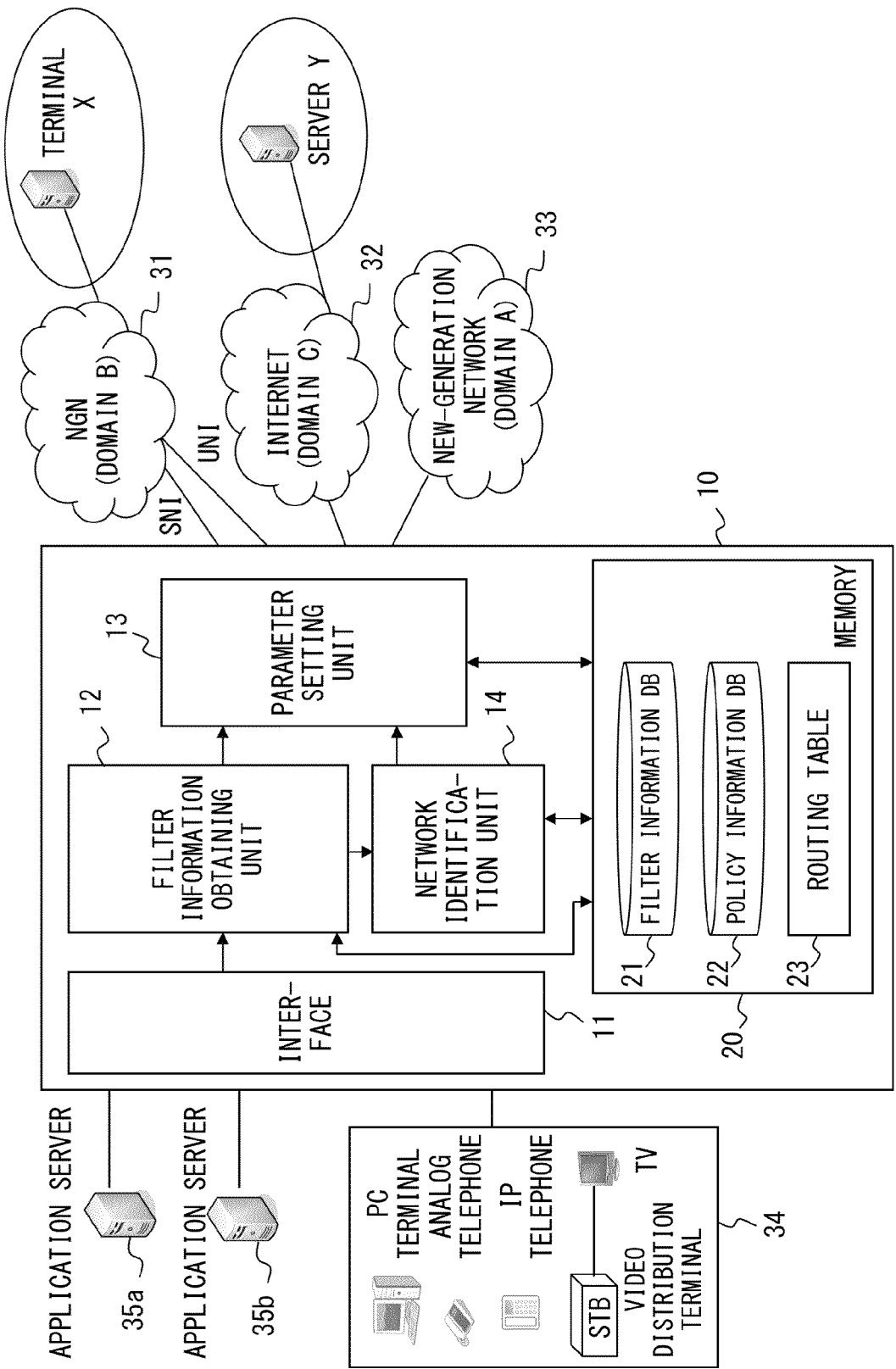
F I G. 1

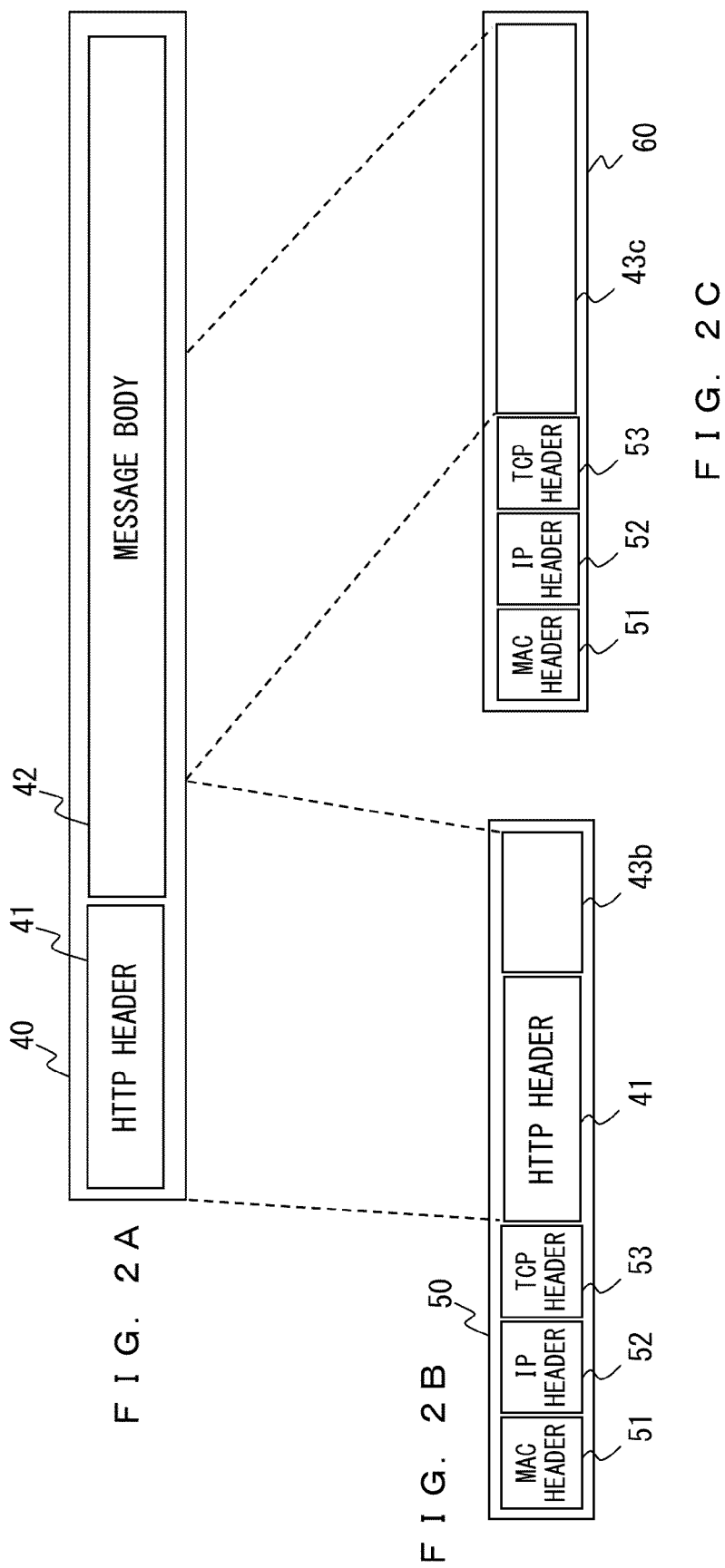

FIG. 3A

| No. | IP SA | IP DA | Protocol | Media type |
|---|---|---|---|---|
| 1 | 10.1.1.1 | 10.2.2.2 | RTP (UDP) | Audio |
| 2 | 10.2.2.2 | 10.1.1.1 | RTP (UDP) | Audio |
| 3 | 10.0.0.1 | 10.1.0.1 | HTTP (TCP) | image/bmp |
| 4 | 10.1.0.1 | 10.0.0.1 | HTTP (TCP) | image/bmp |

FIG. 3B

| No. | IP SA | SPN | IP DA | DPN | Protocol | Media type |
|---|---|---|---|---|---|---|
| 1 | 10.1.1.1 | ANY | 10.2.2.2 | 20000 | RTP (UDP) | Audio |
| 2 | 10.2.2.2 | ANY | 10.1.1.1 | 30000 | RTP (UDP) | Audio |
| 3 | 10.0.0.1 | 10000 | 10.1.0.1 | 80 | HTTP (TCP) | image/jpeg |
| 4 | 10.1.0.1 | 80 | 10.0.0.1 | 10000 | HTTP (TCP) | image/jpeg |

| No. | Domain | MEDIA TYPE | Protocol | PRIORITY LEVEL | QoS mechanism | ADDITIONAL QoS PARAMETER |
|---|---|---|---|---|---|---|
| 1 | A | VOICE | RTP | 3 | Diffserv | DSCP marking(011110)/Diffserv AF |
| 2 | A | IMAGE | HTTP | 5 | HTTP header ext./ PRIORITY CONTROL | ADDING EXTENSION FIELD TO HTTP HEADER (X-QoS-priority = 5) |
| 3 | A | VIDEO | RTP | 6 | MPLS | Label marking information |
| 4 | B | IMAGE/bmp | HTTP | 4 | Diffserv | DSCP marking(100110)/Diffserv EF |
| 5 | B | IMAGE/jpeg | HTTP | 1 | HTTP header ext./ PRIORITY CONTROL | ADDING EXTENSION FIELD TO HTTP HEADER (X-QoS-priority = 1) |
| 6 | B | VIDEO | RTP | 2 | MPLS | Label marking information |

F I G. 4

REQUEST LINE ⟶ GET / gazou.bmp   HTTP/1.1
Accept: */*
Referrer:
http://www.abc.abcom.com/sample.htm
MESSAGE HEADER   Accept-Language: ja
Accept-Encoding: XXX, YYY
User-Agent: ZZZZ
Host: www.abc.abcom.com
Connection: Keep-Alive

F I G. 5

|  |  | VALUE |
|---|---|---|
| Status -Line | HTTP-Version | HTTP/1.1 |
|  | Status-Code | 200OK |
| MESSAGE HEADER | Via | ○×○ |
|  | Date | △△△ |
|  | Cache-Control | no-cache |
|  | Expires | △△△ |
|  | Pragma | no-cache |
|  | Content-Type | image/x-bmp |
|  | Content-Length | (MESSAGE LENGTH) |
| Body | gazou.bmp |  |

FIG. 6

| No. | IP SA | IP DA | ADDITIONAL QoS PARAMETER |
|---|---|---|---|
| 4 | 10.1.0.1 | 10.0.0.1 | DSCP marking(100110)/ Diffserv EF |

FIG. 8

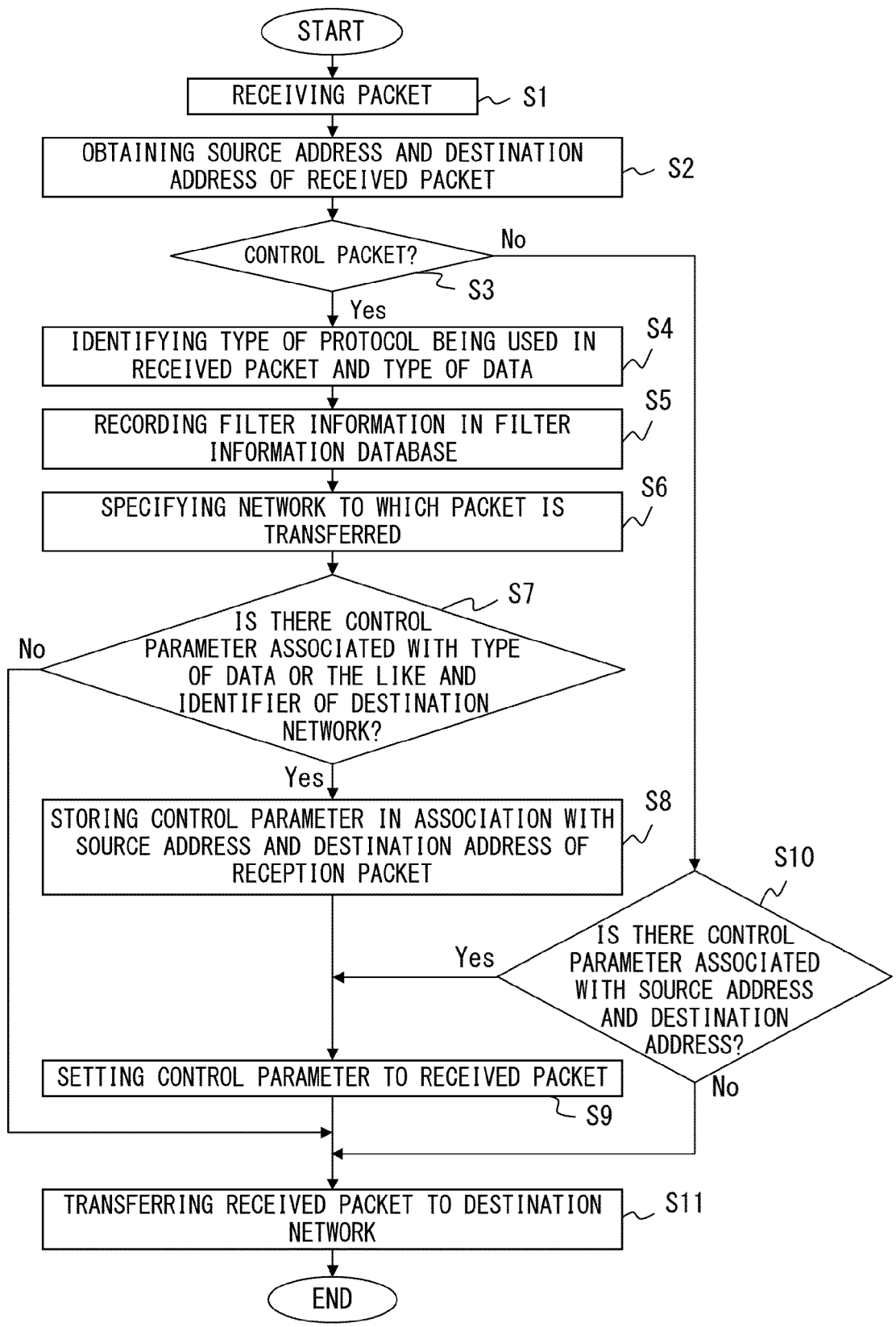
F I G. 9

|  |  | VALUE |
|---|---|---|
| Status-Line | HTTP-Version | HTTP/1.1 |
|  | Status-Code | 200OK |
| MESSAGE HEADER | Via | ○×○ |
|  | Date | △△△ |
|  | Cache-Control | no-cache |
|  | Expires | △△△ |
|  | Pragma | no-cache |
|  | Connection | close |
|  | Content-Type | image/x-jpeg |
|  | Content-Length | (MESSAGE LENGTH) |
| Body | (jpeg IMAGE) |  |

F I G. 1 1 A

|  |  | VALUE |
|---|---|---|
| Status-Line | HTTP-Version | HTTP/1.1 |
|  | Status-Code | 200OK |
| MESSAGE HEADER | Via | ○×○ |
|  | Date | △△△ |
|  | Cache-Control | no-cache |
|  | Expires | △△△ |
|  | Pragma | no-cache |
|  | Connection | close |
|  | Content-Type | image/x-jpeg |
|  | Content-Length | (MESSAGE LENGTH) |
|  | X-QoS-priority | 1 | 
| Body | (jpeg IMAGE) |  |

F I G. 1 1 B

RELAY DEVICE

CROSS-REFERENCE TO RELATED APPLICATION

This application is a continuation application of International Application PCT/JP2010/001720, filed on Mar. 10, 2010, and designated the U.S., the entire contents of which are incorporated herein by reference.

FIELD

The present invention relates to the technique of relaying a packet that is transmitted from the first network to the second network.

BACKGROUND

In recent years, the Internet has been heavily used, and several types of packets including voice packets or video packets are transmitted and received through the Internet. The transmission and reception of voice packets or video packets are greatly affected by delays due to congestion or data loss. For this reason, it is desired that the communication quality be improved. However, a best effort system is adopted on the Internet, and all data is handled equally when an excessive amount of data flows into one communication line. Hence, when the amount of data that is transmitted and received exceeds the capacity of the communication line, the communication quality deteriorates.

Accordingly, a communication network called the Next Generation Network (NGN) has been provided by telecommunications carriers. The NGN is operated by using the guarantee system, which guarantees communication quality such as a minimum communication speed, and the communication quality is managed by using a quality of service (QoS) parameter. For this reason, when a voice packet or the like that includes a QoS parameter is transferred through the NGN, voice data or the like is transferred at a certain quality.

As described above, both the Internet and the NGN are provided, and thus a packet may be transferred from the Internet to the NGN. When a packet is transferred from the Internet to the NGN, the communication quality is not managed even in the NGN and data is transferred with the best effort system unless a QoS parameter is set that supports the management of the communication quality in the NGN.

As a system used when there are services existing in parallel that are operated by different schemes, a communication system that provides Internet Protocol Multimedia Subsystem (IMS) service and non-IMS service is known. In that system, a control server connected to the network refers to a resource control device for resource permission information when receiving a service request, and accepts the service request when permitted. The resource control device transmits the permitted policy information to an access gateway device, and the access gateway device performs priority control or the like by using the received policy information. Also, a protocol such as a HyperText Transfer Protocol (HTTP) is used to transmit and receive data between a server and a browser.

RELATED ART DOCUMENTS

[Patent Document] Patent Document 1: Japanese Laid-open Patent Publication No. 2009-21759

[Non-patent Document] Non-patent Document 1: RFC2616 (Hypertext Transfer Protocol—HTTP/1.1)

SUMMARY

A relay device according to an embodiment includes a receiver, an information obtaining unit, a parameter storage unit, and a parameter setting unit, and relays a packet that is transmitted from the first network to the second network. The receiver receives the packet from the first network. The information obtaining unit obtains data type information for identifying a type of data which is transmitted and received by the packet. The parameter storage unit stores a control parameter, which is used for controlling communication quality in the second network, so as to be associated with a type of transfer data indicating data transferred to the second network. The parameter setting unit sets the control parameter, which is associated with transfer data of a same type as data identified by the data type information, to the packet, and outputs the packet to which the control parameter is set to the second network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of the configuration of a QoS control device according to embodiments.

FIGS. 2A-2C illustrate an example of a control packet and a data packet.

FIGS. 3A and 3B depict examples of a filter information database.

FIG. 4 depicts an example of a policy information database.

FIG. 5 depicts an example of the HTTP header that is processed by a filter information obtaining unit.

FIG. 6 depicts an example of an HTTP header that is included in a second control packet.

FIG. 8 depicts an example of a table in which a control parameter is recorded so as to be associated with filter information.

FIG. 9 is a flowchart illustrating an example of the operation of a relay device according to the First Embodiment.

FIGS. 11A and 11B illustrate an example of a method for adding a QoS parameter to an HTTP header of a second control packet.

DESCRIPTION OF EMBODIMENTS

Figure 7:
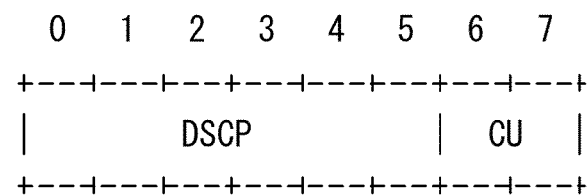
FIG. 7 depicts a TOS field that is used in an IPv4 header.

Regarding a packet to which a parameter or the like that supports the management of the communication quality in a destination network is not set, the communication quality is not managed even if the destination network is operated by the guarantee system. In other words, a packet that is not configured to support a destination network is transferred with the best effort system, and thus the communication quality is not managed even in a network such as the NGN that is operated with the guarantee system. In the background art above, the NGN was mentioned as an example of the network that is operated with the guarantee system, but it is desirable that the communication quality of a packet be improved in any network that is operated with the guarantee system, including a network adapted for a new-generation network.

A relay device according to an embodiment analyzes a header of the received packet or a part of the payload. Moreover, the relay device according to an embodiment stores a method for controlling the communication quality or a control parameter used in a destination network of the received packet so as to be associated with the type of a packet. The relay device specifies a destination network of the received packet from a header of the received packet, and specifies the type of data that is transmitted and received to/from the received packet on the basis of the information included in the payload. The relay device selects a control parameter used for transferring the received packet from the stored control parameter according to the destination network of a packet and the type of the data which is transmitted and received, and sets the selected control parameter to the received packet. The relay device outputs a packet to which the control parameter is set to a destination network.

As described above, when a packet that does not include a parameter used for controlling the communication quality is received by the relay device, the relay device outputs to a destination network a packet to which a destination of the packet and a control parameter corresponding to the type of data included in the packet are set. Accordingly, a packet that is transferred through the relay device to a network operated by the guarantee system becomes an object for which the communication quality is controlled. In the following description, a relay device according to an embodiment will be referred to as a "QoS control device".

When the QoS control device is connected to two or more networks, the QoS control device determines a destination network from a destination address, and sets a parameter according to the control of communication quality used in the destination network of the packet.

FIG. 1 illustrates an example of the configuration of a QoS control device according to embodiments. A QoS control device 10 depicted in FIG. 1 is connected to networks such as an NGN 31, an Internet 32, and a new-generation network 33. The QoS control device 10 may be connected to an Internet Protocol (IP) device 34 or application servers 35 (35*a*, 35*b*). In the following description, it is assumed that the NGN 31, the Internet 32, and the new-generation network 33 have the domain names of "B", "C", and "A", respectively.

The QoS control device 10 includes an interface 11, a filter information obtaining unit 12, a parameter setting unit 13, a network identification unit 14, and a memory 20. The memory 20 includes a filter information database 21, a policy information database 22, and a routing table 23.

The interface 11 receives an IP packet from an IP device 34 such as a computer, an IP telephone set, and a video streaming terminal, or an application server 35, where the IP device 34 and the application server 35 are connected to the QoS control device 10. Moreover, the interface 11 converts the format as necessary. Furthermore, the interface 11 receives a packet from a network such as the NGN 31 or the Internet 32. The interface 11 outputs to the filter information obtaining unit 12 the packet received from a network such as the NGN 31, the IP device 34, or the application server 35.

The filter information obtaining unit 12 obtains a destination address or a source address from the IP header of a packet. In the following description, it is assumed in order to aid in understanding that all packets (reception packets) received by the QoS control device 10 are classified into data packets or control packets. A control packet includes information used for transmitting and receiving a data packet, and includes, for example, information for specifying the type of the data which is transmitted and received. Note that the information for specifying the type of the data which is transmitted and received may be referred to as data type information. In the following description, it is assumed that the QoS control device 10 identifies the type of the data which is transmitted and received by a data packet according to information included in the control packet. As will be described later, the QoS control device 10 may store a control parameter selected for a control packet together with a source address and a destination address of the control packet so as to be used for processing the data packet.

FIGS. 2A-2C illustrate an example of a control packet 50 and a data packet 60. FIG. 2A depicts the data generated by an HTTP application, and FIGS. 2B and 2C depict an example of the control packet 50 and the data packet 60, respectively. As depicted in FIG. 2A, the data 40 that is generated by the application includes an HTTP header 41 and a message body 42. When the size of the application data 40 is larger than the maximum segment size, the application data 40 is divided into sizes in which each size is smaller than the maximum segment size. After a TCP header 53, an IP header 52, and a Media Access Control (MAC) header 51 are added to each of the divided fragments, the divided fragments are transmitted to a network. In the following description, a packet that includes an application header will be referred to as the control packet 50. On the other hand, a packet that does not include an application header will be referred to as the data packet 60. In the example of FIG. 2A, the HTTP header 41 is an application header. As depicted in FIG. 2B, the control packet 50 includes the HTTP header 41, but as depicted in FIG. 2C, the data packet 60 does not include the HTTP header 41. In the following description, the HTTP header 41, the fragments 43 (43*b*, 43*c*) of a message body and the TCP header 53 may be referred to as "payload".

Furthermore, the filter information obtaining unit 12 analyzes a portion of the payload, and obtains the type of the data which is transmitted and received or the like. For example, the filter information obtaining unit 12 may analyze the HTTP header 41 in the payload of the control packet 50 to specify the type of data. Furthermore, the filter information obtaining unit 12 may specify the type of data designated by any protocol including HyperText Markup Language (HTML), Extensible Markup Language (XML), a Simple Object Access Protocol (SOAP), a Session Initiation Protocol (SIP), or the like. In the following description, the type of data, the destination address, or the like that are specified by the QoS control device 10 may be referred to as "filter information". The filter information obtaining unit 12 stores the obtained filter information in the filter information database 21, and outputs a packet to the parameter setting unit 13. The filter information obtaining unit 12 may also notify the parameter setting unit 13 and the network identification unit 14 of the obtained filter information. The operations of the filter information obtaining unit 12 will be described later in detail.

On the basis of the filter information database 21 and the policy information database 22, the parameter setting unit 13 sets a control parameter to the control packet 50 or data packet 60, which is to be processed. The operations of the parameter setting unit 13 will be described later.

The network identification unit 14 obtains an IP address of a router to which a reception packet is transferred on the basis of the destination address of the packet received by the QoS control device 10 and the routing table 23. Furthermore, the network identification unit 14 identifies a destination network by using the obtained IP address. Also, the network identification unit 14 notifies the parameter setting unit 13 of an identifier for identifying a destination network.

In the filter information database 21, the filter information is recorded. FIGS. 3A and 3B depict examples of the filter information database 21. In the filter information database 21 depicted in FIG. 3A, an IP source address (IP SA), an IP destination address (IP DA), a protocol, and a media type of the reception packet are recorded. In the protocol field, the type of a protocol of a transport layer that is used in the reception packet such as a Transmission Control Protocol (TCP) or a User Datagram Protocol (UDP) is recorded. Optionally, a type of protocol that is at a higher-order than TCP or UDP such as an HTTP or real-time transport protocol (RTP) may be recorded in the protocol field. In the media type field, what type of media the transmitted and received data is classified into, for example images or voices, is recorded. In the example of FIG. 3A, the type of the data packet 60 is classified under the protocol field and the media type field. Note that FIG. 3A is an example of the filter information, and the information that is included in the filter information may be changed according to the implementation. For example, as depicted in FIG. 3B, the filter information database 21 may also record a source port number (SPN) and a destination port number (DPN).

The policy information database 22 stores a control parameter or the like used for controlling the communication quality in the destination network of a packet so as to be associated with the destination network and the type of the transferred data. A control parameter includes, for example, an application header such as the HTTP header 41 or a parameter written into the IP header 52 or the like. A control parameter may be, for example, a specified value of a user-defined header of the HTTP header 41, a TOS field of the IP header 52, information used for designating a priority level, and a parameter used for marking a label. FIG. 4 depicts an example of the policy information database 22. In the example of FIG. 4, a media type, a priority level, a QoS control method, an additional QoS parameter, or the like are recorded in the policy information database 22 so as to be associated with the identifier of a network to which a packet is transferred. In the example of FIG. 4, a control parameter is an additional QoS parameter.

For example, in the row of No. 3 of the policy information database 22 of FIG. 4, a case of Domain A where the communication quality of video data is controlled by Multi-Protocol Label Switching (MPLS) is recorded. Further, in the field of an additional QoS parameter of the policy information database 22, the marking information of an MPLS label is recorded. On the other hand, in a case of domain A where the quality control of a voice packet is performed by the Differentiated Services (Diffserv), a packet type and a QoS control method are recorded as depicted in the row of No. 1. When communication control is performed in the destination network of a packet by using Diffserv, a DiffServ Code Point (DSCP) marking value according to the Per-Hop Behavior (PHB) of a router is recorded in the field of an additional QoS parameter. For example, No. 4 represents a case in which the Expedited Forwarding PHB (EF) is performed, and No. 1 represents a case in which the Assured Forwarding PHBs (AF) is performed.

The policy information database 22 is created in advance by an operator or the like according to a network to which the QoS control device 10 may transfer a reception packet and a quality control method that is performed in the network. Accordingly, when a router included in the destination network of a packet is able to process the control information that is processed by a protocol of a higher-order layer than the transport layer, an additional QoS parameter may be determined according to the processes in a destination network. For example, a router included in domain A or B controls the quality according to the information included in the HTTP header 41, and the policy information database 22 may record a parameter to be added to the HTTP header 41 as depicted in Nos. 2 and 5.

Note that the policy information database 22 may include information other than the information listed in FIG. 4 depending on the implementation. The operations of the QoS control device 10 using the policy information database 22 will be described later.

First Embodiment

Hereinafter, it is assumed that a terminal X connected to the NGN 31 of FIG. 1 obtains image data from a server Y connected to the Internet 32, and the operations of the QoS control device 10 will be described. Here, it is also assumed that the terminal X transmits to the server Y a control packet 50 that includes an HTTP request message using TCP at a network layer. It is assumed that the server Y transmits the control packet 50 and the data packet 60 to the terminal X in response to the request transmitted from the terminal X, thereby transmitting image data to the terminal X. Moreover, in the present embodiment, it is assumed that the filter information database 21 of FIG. 3A is used. Note that the following descriptions are given only as examples of the operations of the QoS control device 10, and thus changes may be made, for example, by changing the order of the procedures (2)-(4) below. The order between the procedures (1) and (2) may also be changed, and the order between the procedures (12) and (13) may also be changed.

(1) The interface 11 outputs a packet (first control packet) which received from the terminal X via the NGN 31 to the filter information obtaining unit 12. The filter information obtaining unit 12 checks if the received packet is the control packet 50. The control packet 50 may be checked, for example, by checking the HTTP header 41 in the payload, a request line in the HTTP header 41, or the like.

(2) Once the first control packet 50 is input, the filter information obtaining unit 12 obtains the destination address and the source address from the IP header 52 of the control packet 50. In this example, the destination address of the first control packet 50 is the IP address of the server Y, and the source address of the first control packet 50 is the IP address of the terminal X.

(3) The filter information obtaining unit 12 analyzes the payload of an IP packet to identify the type of the protocol that is used for processing a payload section. For example, if the payload of the first control packet is a TCP segment, the filter information obtaining unit 12 detects the TCP header 53 and thereby identifies that a TCP is being used for processing a packet. Furthermore, the filter information obtaining unit 12 also identifies a higher-order protocol of TCP by detecting an application header and identifying its type. For example, the filter information obtaining unit 12 identifies that HTTP is used by detecting the HTTP header 41.

(4) The filter information obtaining unit 12 further obtains from the HTTP header 41 the type of data of the data that is included in the data packet 60 or the like. FIG. 5 depicts an example of the HTTP header 41 that is processed by the filter information obtaining unit 12. The HTTP header 41 depicted in the example of FIG. 5 is used as a request message, and includes a request line and a message header. The filter information obtaining unit 12 identifies the media type of the data that is included in the data packet 60, which is transmitted from the destination address to the source address of the control packet 50, by using an extension of the file that is designated in the request line. In the example of FIG. 5, the file named "gazou.bmp" is read by using the GET method, and the filter information obtaining unit 12 thereby identifies that the media type is a bmp image. In the TCP transport, the same connection information is used in both the upstream direction and the downstream direction. Accordingly, the filter information obtaining unit 12 assigns the same media type as the information assigned in the request line to the type of the packet. Cases in which the media type is a bmp image were described in the above, but the type of an image is not limited to a bmp file. For example, any image file including a Joint Photographic Experts Group (jpeg) file or a Tagged Image File Format (tiff) file may be used.

(5) The filter information obtaining unit 12 records the obtained filter information in the filter information database 21. In the present example, it is assumed that the filter information obtaining unit 12 records the filter information that is depicted in No. 3 of FIG. 3A. Furthermore, the filter information obtaining unit 12 notifies the parameter setting unit 13 and the network identification unit 14 of the fact that the filter information has been recorded as well as of the number assigned to the recorded filter information. Moreover, the filter information obtaining unit 12 outputs the received control packet 50 to the parameter setting unit 13.

(6) Once the parameter setting unit 13 and the network identification unit 14 are notified of the fact that the filter information has been recorded, the parameter setting unit 13 and the network identification unit 14 obtain the filter information by referring to the filter information database 21.

The network identification unit 14 determines the IP address of a router or the like that transfers the control packet 50 by using the destination address included in the filter information and the routing table 23. Furthermore, the network identification unit 14 obtains an identifier by which a domain including the IP address of a destination router or the like is identified by using, for example, the domain information search service. In the present example, the network identification unit 14 decides to transfer the first control packet to a router included on the Internet 32 by using the routing table 23. It is assumed that the network identification unit 14 recognizes that the domain name of the network including a destination router is "C" by using the whois service. The network identification unit 14 notifies the parameter setting unit 13 of the obtained identifier.

(7) The parameter setting unit 13 refers to the policy information database 22, and extracts an identifier of the network to which the control packet 50 to be processed is transferred and a parameter that is stored in association with the filter information obtained from the filter information database 21. Here, the Internet 32, identified by the domain name of "C", does not control the quality of the data packet 60, and thus a parameter that corresponds to "C" is not recorded in the policy information database 22. For this reason, the parameter setting unit 13 outputs the first control packet to a destination router that is included on the Internet 32, without setting any parameter to the first control packet.

(8) Once the first control packet is obtained through the Internet 32, the server Y processes the first control packet. Here, it is assumed that in response to a request by the first control packet, the server Y returns to the terminal X a response message that includes the binary data of "gazou.bmp". The server Y transmits to the terminal X a control packet (second control packet) that includes the HTTP header 41. An example of the HTTP header 41 included in the second control packet is depicted in FIG. 6. As the second control packet is output from the server Y to the Internet 32, the second control packet does not include a parameter or the like used by the NGN 31 for controlling the communication quality. In other words, in regard to the second control packet that is output from the server Y to the Internet 32, the communication quality is not controlled by the NGN 31.

(9) The QoS control device 10 receives the second control packet through the Internet 32. Once the second control packet is received, the QoS control device 10 obtains information such as a destination address of the second control packet in a similar manner to procedures (1)-(3) above. Further, the interface 11 may detect a status line to detect that the second control packet is the control packet 50. The filter information obtaining unit 12 may identify the media type by checking, for example, what is described in Content-Type. In the present example, it is assumed that the filter information obtaining unit 12 records the filter information that is depicted in No. 4 of FIG. 3A. Further, the filter information obtaining unit 12 outputs the second control packet to the parameter setting unit 13.

(10) The network identification unit 14 uses a destination address included in the filter information and the routing table 23 to obtain the IP address of a router that transfers the second control packet, and further obtains the domain name of the network that includes a destination router. Here, the destination of the second control packet is a router that is included in the NGN 31. The network identification unit 14 notifies the parameter setting unit 13 of the domain name "B" of the NGN 31.

(11) The parameter setting unit 13 obtains from the policy information database 22 the filter information of the second control packet and a parameter that is recorded in association with the domain name reported by the network identification unit 14. Once the record of the policy information database 22, which is depicted as No. 4 of FIG. 4, is referred to, the parameter setting unit 13 recognizes that the priority level of a packet used for transmitting image data to the domain B is "4" and that the priority is controlled by using "Diffserv".

(12) Further, the parameter setting unit 13 changes the IP header 52 according to what is assigned in an additional QoS parameter.

FIG. 7 illustrates the Type of Service (TOS) field which is used in an IPv4 header. When the communication quality is controlled by using the DSCP marking, the parameter setting unit 13 writes an additional QoS parameter in the higher-order 6 bits of the TOS field according to what is assigned in the policy information database 22. Here, EF is designated, and thus the parameter setting unit 13 writes "100110" into the TOS field. Note that the lower-order 2 bits of the TOS field are not used for control (currently unused, CU). Further, the parameter setting unit 13 calculates the checksum of the IP header 52 according to the changes made in the TOS field, and changes the value of the checksum.

(13) The parameter setting unit 13 stores the control parameter set in the second control packet so as to be associated with the destination address and source address of the second control packet. In the following descriptions, it is assumed that the parameter setting unit 13 stores a value of the DSCP marking so as to be associated with the source address and destination address of the second control packet, as depicted in FIG. 8. Although the parameter setting unit 13 is provided with the table of FIG. 8, the parameter setting unit 13 may also be provided with a table in which the information not included in the table of FIG. 8 is included. For example, the parameter setting unit 13 may store the filter information so as to be associated with a value of the DSCP marking.

(14) The parameter setting unit 13 transmits the second control packet to which a parameter is set to a router included in the NGN 31.

(15) Once the second control packet to which a parameter is set is received, the router of the NGN 31 checks the IP header 52 of the second control packet. Here, the TOS field is DSCP-marked. Thus, the router that is included in the NGN 31 performs priority control according to the designated control method, and controls the communication quality of a packet that is transmitted from the server Y to the terminal X.

(16) Subsequent to the second control packet, the server Y transmits to the terminal X the data packet 60 including the binary data of "gazou.bmp". As the data packet 60 is output from the server Y to the Internet 32 in a similar manner to the second control packet, the data packet 60 does not include a parameter or the like used by the NGN 31 for controlling the communication quality. In other words, the data packet 60 output from the server Y is not controlled the communication quality by the NGN 31 unless the data packed 60 is added a control parameter.

(17) The QoS control device 10 receives the data packet 60 through the Internet 32. Once it is confirmed that the input packet is the data packet 60, the filter information obtaining unit 12 obtains the destination address and source address of the data packet 60, and notifies the parameter setting unit 13 of the obtained addresses. The parameter setting unit 13 compares the destination address and source address of the data packet 60 with the destination address and the source address that are stored in the table of FIG. 8. When the destination addresses and the source addresses match, the parameter setting unit 13 rewrites the IP header 52 of the data packet 60 using a record in the field of "additional QoS parameter" of FIG. 8 in a similar manner to the second control packet 50. Further, the parameter setting unit 13 transmits the data packet 60 for which the IP header 52 is rewritten to a router included in the NGN 31.

(18) The router included in the NGN 31 checks the IP header 52 of the data packet 60, and performs priority control according to what is assigned and recorded in the TOS field. Accordingly, the best effort system is used when user data is transferred through the Internet 32 arranged between the server Y and the QoS control device 10, but the communication quality may be controlled when the user data is transferred through the NGN 31.

In the example described above, cases in which EF of Diffserve is designated are described. However, the parameter setting unit 13 may operate according to what is assigned in the policy information database 22 or a protocol used in the data packet 60 or the like. For example, as depicted in No. 1 of FIG. 4, when AF is designated in the policy information database 22, the parameter setting unit 13 writes a DSCP value of "011110", which indicates AF, into the IP header 52. When IPv6 is used, the parameter setting unit 13 may rewrite the Traffic Class field. When a packet transfer is performed in the NGN 31 by using MPLS, the parameter setting unit 13 may give the label marking of MPLS.

FIG. 9 is a flowchart in which an example of the operation of a relay device according to the First Embodiment is illustrated. In the flowchart of FIG. 9, an example of the case in which procedure (2) is performed before procedure (1) and procedure (13) is performed before procedure (12) is illustrated.

The filter information obtaining unit 12 receives a packet through the interface 11, and then obtains the source address and the destination address (steps S1, S2). Further, the filter information obtaining unit 12 confirms whether or not the obtained packet is the control packet 50 by checking if an application header is included in the received packet (step S3). When the received packet is the control packet 50, the filter information obtaining unit 12 recognizes the type of the protocol being used and the type of the data which is transmitted and received by analyzing a payload (step S4). The filter information obtaining unit 12 records the filter information obtained in steps S2 and S4 in the filter information database 21 (step S5). The network identification unit 14 specifies the network to which the control packet 50 is transferred on the basis of the record in the filter information database 21 (step S6). The parameter setting unit 13 examines whether a control parameter associated with the type of the data designated by the control packet 50 or the like and an identifier of the destination network are stored in the policy information database 22 (step S7). When no associated control parameter is stored, the QoS control device 10 transfers the control packet 50 and terminates the process (step S7). When an associated control parameter is stored in policy information database 22, the parameter setting unit 13 stores the control parameter so as to be associated with the source address and destination address of the reception packet (step S8). The parameter setting unit 13 sets the associated control parameter to the control packet 50 and transfers the set control packet 50 to the destination network (steps S9, S11). On the other hand, when the packet received by the QoS control device 10 is not the control packet 50, the parameter setting unit 13 checks whether the control parameter is stored in association with the source address and destination address of the received packet (step S10). In step S10, when a control parameter is stored in the parameter setting unit 13, the parameter setting unit 13 sets the stored control parameter to a reception packet, and then transmits the set reception packet to a destination network (steps S9, S11). In step S10, when a control parameter is not stored in the parameter setting unit 13, the parameter setting unit 13 transmits a reception packet to a destination network without changing the setting of the reception packet (steps S10, S11).

As described above, the best effort system is used when the control packet 50 and the data packet 60 that are output from the server Y to the terminal X are transferred through the Internet 32, but the guarantee system is used when the control packet 50 and the data packet 60 are transferred through the NGN 31. In other words, when the image data is transmitted from the server Y to the terminal X by the control packet 50 and the data packet 60, the communication quality is controlled at the NGN 31 according to the priority level of the image data. Regarding the data transmitted from the server Y to the terminal X, loss or the like may be caused at the Internet 32 due to congestion or the like, but after being transferred to the NGN 31, the data is controlled according to the priority level. Hence, congestion has a smaller impact on the data transmitted from the server Y to the terminal X when the data is transferred through NGN 31. The communication quality improves after the data is transferred to the NGN 31, and thereby the communication quality of the image data that the terminal X receives from the server Y improves.

In a similar manner to a packet transferred from the Internet 32 to the NGN 31, the QoS control device 10 may set a parameter to a packet transferred from the Internet 32 to the NGN 31 or the new-generation network 33 according to the destination network. As depicted in the example of FIG. 4, the policy information database 22 may store a parameter which supports the quality control performed at networks to which the QoS control device 10 is connected, so as to be associated with the destination network. Moreover, as the QoS control device 10 includes the filter information obtaining unit 12, the parameter setting unit 13, and the network identification unit 14, the QoS control device 10 may identify the destination network of a packet. Further, the QoS control device 10 may set a parameter according to the destination network. Accordingly, the QoS control device 10 may be connected to two or more networks, and may process a packet in accordance with the destination to which the packet is transferred.

In the descriptions above, cases in which TCP and HTTP are used for a network layer and an application layer, respectively, in the communication are described. However, even if other protocols are used, the QoS control device 10 may perform processing in a similar manner. For example, even if UDP or RTP is used as depicted in Nos. 1 and 2 of FIG. 3A, the filter information obtaining unit 12 may obtain filter information. In this case, the filter information obtaining unit 12 detects a UDP header in the payload to recognize that the protocol is UDP. Moreover, the filter information obtaining unit 12 may recognize a higher-order protocol of UDP by detecting, for example, an RTP header.

Second Embodiment

In the First Embodiment, cases in which a destination router included in the NGN 31 performs priority control by using the IP header 52 are described. However, in some cases, a router in the destination network may obtain information that is handled in a higher-order layer than the network layer. In such cases, the QoS control device 10 may mark a header that is processed in a layer higher than the network layer. Hereinafter, cases will be described in which, as in the setting of No. 5 of FIG. 4, marking on the HTTP header 41 is designated in the policy information database 22 and the QoS control device 10 marks the HTTP header 41. In the Second Embodiment, the filter information that is depicted in FIG. 3B is used. Also in the Second Embodiment, the communication in which TCP and HTTP are used for a network layer and an application layer, respectively, will be described. In the following description, cases in which the terminal X obtains jpeg image data from the server Y connected to the Internet 32 will be described as an example.

In the TCP transport, the same connection information is used for the upstream direction and the downstream direction. Accordingly, the filter information obtaining unit 12 may use the first control packet to register the filter information of the second control packet in the filter information database 21. In this case, the QoS control device 10 may manage the filter information of the first control packet and the filter information of the second control packet as a pair of connections of the upstream direction and the downstream direction by also using a port number included in a control packet.

(1a) The packet that is received by the QoS control device 10 is processed by the interface 11 or the filter information obtaining unit 12 in a similar manner to procedure (1), and whether the packet is the control packet 50 is checked.

(2a) The filter information obtaining unit 12 obtains a destination address, a source address, a source port number, and a destination port number from the first control packet.

Figure 10A:
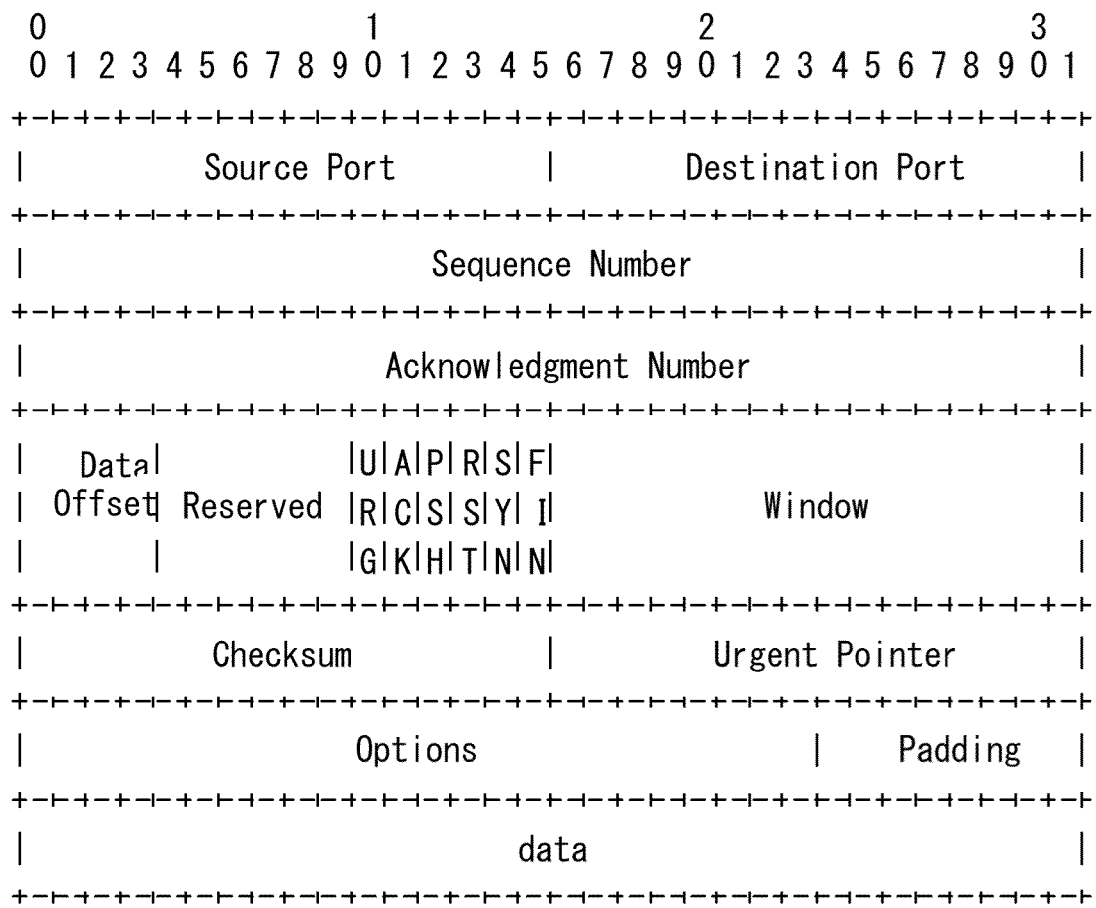
FIGS. 10A and 10B depict the format of a TCP header and a UDP header.
Figure 10B:
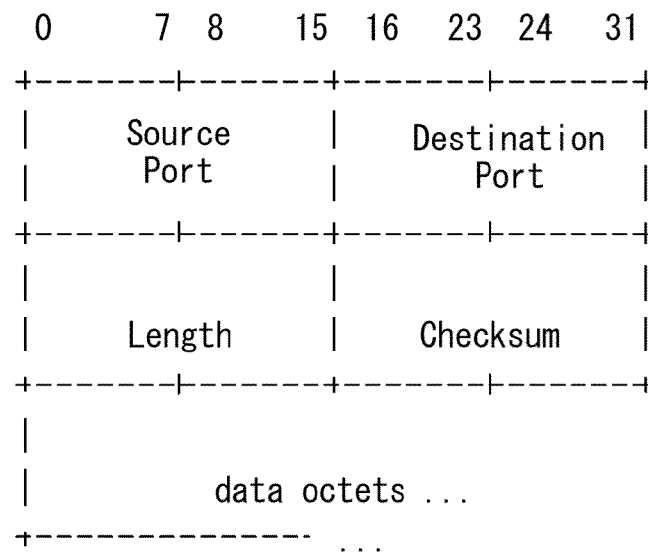

FIGS. 10A and 10B depict the format of a TCP header and a UDP header. When TCP is used for processing the first control packet, a TCP header in the format of FIG. 10A is included in the payload. A TCP header includes a source port number, a destination port number, a sequence number, an acknowledgement number, a data offset, a control bit, a window, a checksum, an urgent pointer, or the like. Accordingly, the filter information obtaining unit 12 obtains a source port number from the first 16 bits of the TCP header, and obtains a destination port number from the next 16 bits of the TCP header.

(3a) The filter information obtaining unit 12 obtains a protocol and a media type which are used for processing the first control packet in a similar manner to procedure (3) or (4). The filter information obtaining unit 12 records the obtained information in the filter information database 21 as depicted in FIG. 3B. For example, it is assumed that the filter information obtained from a first control message is as depicted in No. 3 of FIG. 3B.

(4a) The filter information obtaining unit 12 monitors the establishment of a connection by using the HTTP header 41 of a control packet. For example, when a GET request is detected in the HTTP header 41, the filter information obtaining unit 12 recognizes the establishment of a connection.

(5a) The filter information obtaining unit 12 swaps the destination address and the source address of the first control packet to store the filter information of No. 4 in FIG. 3B in the filter information database 21. Moreover, the filter information obtaining unit 12 records the destination port number of the filter information of No. 3 and the source port number of the filter information of No. 3 as the source port number of the filter information of No. 4 and the destination port number of the filter information of No. 4, respectively.

(6a) The filter information obtaining unit 12 notifies the parameter setting unit 13 and the network identification unit 14 of the fact that the filter information has been recorded together with the number assigned to filter information of the first control packet. Moreover, the filter information obtaining unit 12 outputs the first control packet to the parameter setting unit 13. The network identification unit 14 obtains the domain name of the destination network of the first control packet in a similar manner as the procedure (6) described above. The network identification unit 14 notifies the parameter setting unit 13 of the obtained domain name (C).

(7a) The parameter setting unit 13 obtains a control parameter by using the domain name reported by the network identification unit 14. Here, no parameter that corresponds to "C" is recorded, and thus the QoS control device 10 outputs to the Internet 32 the first control packet without setting a parameter thereto.

(8a) Once the first control packet is received, the server Y transmits to the terminal X the binary data of the jpeg image that is requested in response to the first control packet. Here, it is assumed that the second control packet and the data packet 60 are transmitted from the server Y to the terminal X.

(9a) Once the second control packet is received, the filter information obtaining unit 12 obtains the filter information from the second control packet, and compares the obtained filter information with the filter information that is recorded in the filter information database 21. Here, the filter information obtaining unit 12 checks if the filter information of the second control packet matches the filter information of No. 4. The filter information obtaining unit 12 notifies the parameter setting unit 13 and the network identification unit 14 of the fact that a control packet including the filter information of No. 4 has been received. Furthermore, the filter information obtaining unit 12 checks if the filter information of No. 3 and No. 4 are the filter information of the control packet 50, which is used for transmitting and receiving data between the two nodes.

(10a) The filter information obtaining unit 12 checks the value of a connection field that is included in the HTTP header 41 of the second control packet. For example, when the connection field is set to "Keep-Alive" or the like, which indicates that the connection is maintained, the filter information obtaining unit 12 recognizes that the connection between the terminal X and the server Y is maintained. On the other hand, when the connection field is set to "Close" or the like, the filter information obtaining unit 12 recognize that the connection between the terminal X and the server Y will be terminated when the transmission and reception of the data packet by using the second control packet 50 is completed.

Here, it is assumed that the connection field of the second control packet is "Close", as depicted in FIG. 11A. Accordingly, the filter information obtaining unit 12 monitors the completion of the communication process where the second control packet is used. For example, the filter information obtaining unit 12 may detect the completion of the communication by checking a "FIN" bit that is included in a control bit of the TCP header 53 of the second control packet 50. In the following description, it is assumed that when the value of "FIN" included in the data packet 60 is "1", the communication where the second control packet is used is terminated. Here, it is also assumed that the value of a "FIN" bit included in the second control packet 50 is "0". The filter information obtaining unit 12 recognizes that the data packet 60 is transmitted thereto subsequent to the second control packet 50.

(11a) The network identification unit 14 obtains filter information from the filter information database 21. The network identification unit 14 uses the filter information and the routing table 23 to obtain the IP address of a router that transfers the second control packet, and further obtains the domain name of the network that includes a destination router. Here, the network identification unit 14 obtains the domain name (B) of the NGN 31 to notify the parameter setting unit 13 of the obtained domain name (B).

(12a) The parameter setting unit 13 obtains from the policy information database 22 a parameter that is recorded in association with the domain name reported by the network identification unit 14. Here, once the information which is depicted as No. 5 of FIG. 4 is obtained, the parameter setting unit 13 recognizes that the priority level of a packet used for transmitting jpeg image data to the domain B is "1" and that the priority is controlled by using the HTTP header 41 for the second control packet.

Furthermore, the parameter setting unit 13 changes the HTTP header 41 of the second control packet according to what is assigned in the additional QoS parameter, as depicted in FIG. 11B. Here, a newly added X-QoS-priority header field is set by using a user-defined header that is defined, for example, in the Request for Comments (RFC) 822 of the Internet Engineering Task Force (IETF). The parameter setting unit 13 adds the header field of X-QoS-priority to the HTTP header 41 of the second control packet, and the value designated by that header field is "1".

(13a) The parameter setting unit 13 stores values, status lines, or the like, which are designated in the header field included in the HTTP header 41 designated by an X-QoS-priority field and in other fields, so as to be associated with the filter information in No. 4 of FIG. 3B. Again, the parameter setting unit 13 may store the filter information and the information included in the HTTP header 41 of FIG. 11B by using a table or the like.

(14a) The parameter setting unit 13 transmits the second control packet to which a parameter is set to a router included in the NGN 31.

(15a) Once the second control packet to which a parameter is set is received, the router of the NGN 31 checks an X-QoS-priority field of the HTTP header 41 of the second control packet. Here, it is assumed that the router included in the NGN 31 is configured to control the communication quality in advance according to a value of the X-QoS-priority field of the HTTP header 41. A priority level is recorded in the X-QoS-priority field of the second control packet. Thus, the router that is included in the NGN 31 performs priority control according to the recorded priority level, and controls the communication quality of a packet that is transmitted from the server Y to the terminal X.

(16a) The filter information obtaining unit 12 obtains a destination address, a source address, a destination port number, and a source port number of the data packet 60, which are transmitted subsequent to the second control packet, and notifies the parameter setting unit 13 of the obtained information.

Further, the filter information obtaining unit 12 checks a control bit in the TCP header 53 of the data packet 60. Here, it is assumed that the value of the "FIN" bit included in the data packet 60 is "1", and that the completion of the data transmission was indicated. Upon detecting of instruction on the termination of the connection in procedure (10a), the filter information obtaining unit 12 monitors the completion of the communication. Hence, when outputting the data packet 60 in which the "FIN" bit is set to "1" to the parameter setting unit 13, the filter information obtaining unit 12 requests a notification of the transfer termination of the data packet 60.

(17a) The parameter setting unit 13 compares a destination address or the like reported by the filter information obtaining unit 12 with a destination address or the like included in the table which is stored by the parameter setting unit 13 in procedure (13a). Here, it is assumed that a destination address or the like reported by the filter information obtaining unit 12 matched a destination address or the like included in the table stored by the parameter setting unit 13. Then, the parameter setting unit 13 adds the HTTP header 41 to which an X-QoS-priority header field is added (FIG. 11B) to the payload of the data packet 60, and transmits it to a router included in the NGN 31. The parameter setting unit 13 may add the HTTP header 41 to which an X-QoS-priority header field is added, for example, after the TCP header 53.

(18a) The parameter setting unit 13 notifies the filter information obtaining unit 12 of the completion of the transferring process of the data packet 60. Once the notification is received, the filter information obtaining unit 12 determines that the communication using the second control packet is complete. When the completion of the transmission and reception of the data is detected, the filter information obtaining unit 12 accesses the filter information database 21 to delete the filter information of the connection to be terminated. Here, the filter information obtaining unit 12 deletes the filter information of Nos. 3 and 4 of FIG. 3B. Further, the filter information obtaining unit 12 notifies the parameter setting unit 13 of the filter information number of the connection where the communication is terminated. In the present example, the parameter setting unit 13 is notified of the deletion of the filter information of Nos. 3 and 4. The parameter setting unit 13 then deletes the HTTP header that is stored in association with the filter information of Nos. 3 and 4.

(19a) The router included in the NGN 31 checks the HTTP header 41 added to the data packet 60, and performs priority control according to the priority level recorded in the X-QoS-priority field. Accordingly, the best effort system is used when user data is transferred through the Internet 32 arranged between the server Y and the QoS control device 10, but the communication quality may be controlled when the user data is transferred through the NGN 31.

The example described above is given as an example of the operations of the QoS control device 10 according to the Second Embodiment, and thus the order of the procedures may be changed depending on the implementation. Further, the process of recording and deleting the filter information may be performed for every connection. Moreover, the header field that is defined in the HTTP header 41, the values to be set, or the like may be changed depending on the implementation.

Figure 12A:
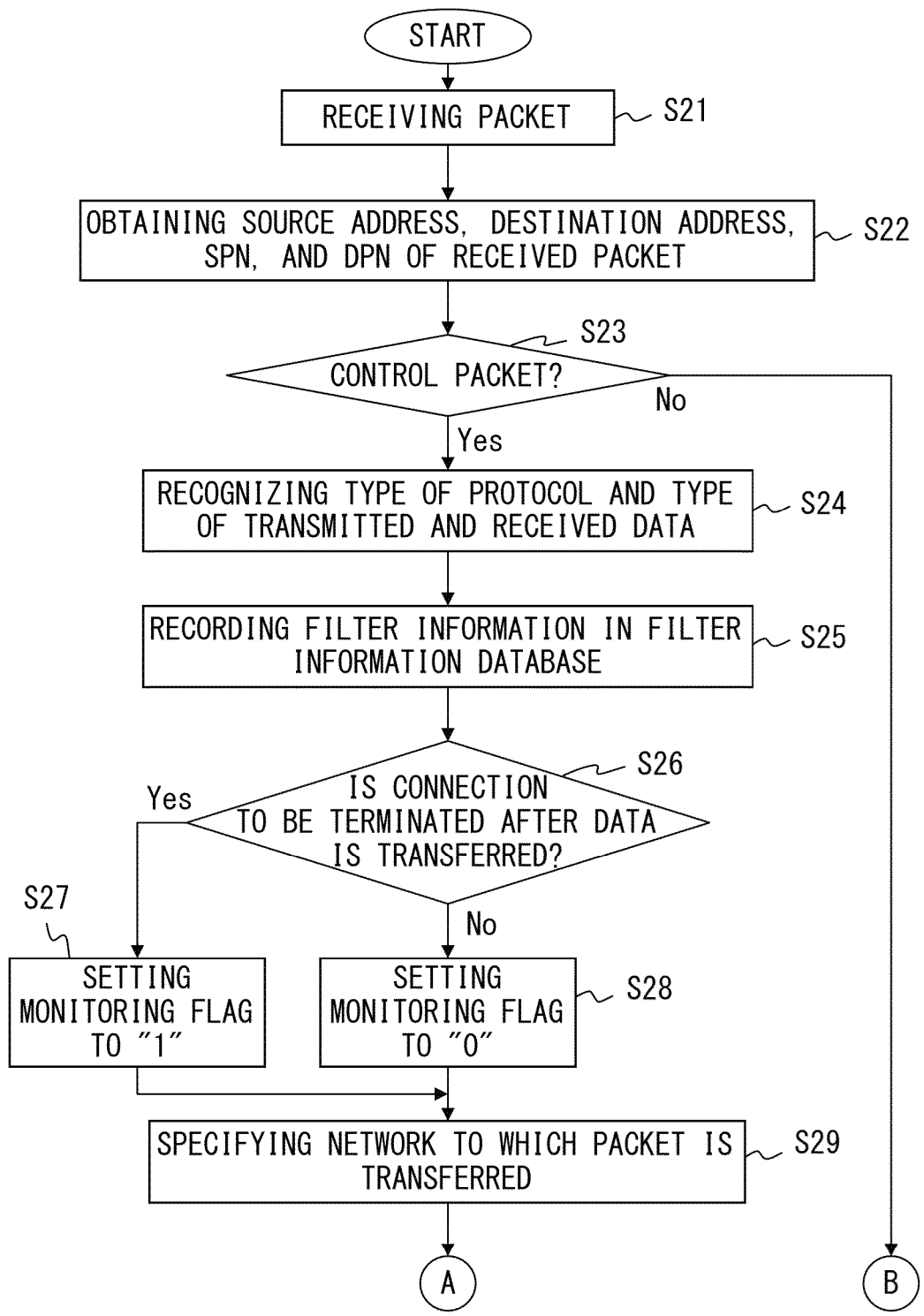
FIGS. 12A and 12B are flowcharts illustrating an example of the operation of a QoS control device according to the Second Embodiment.
Figure 12B:
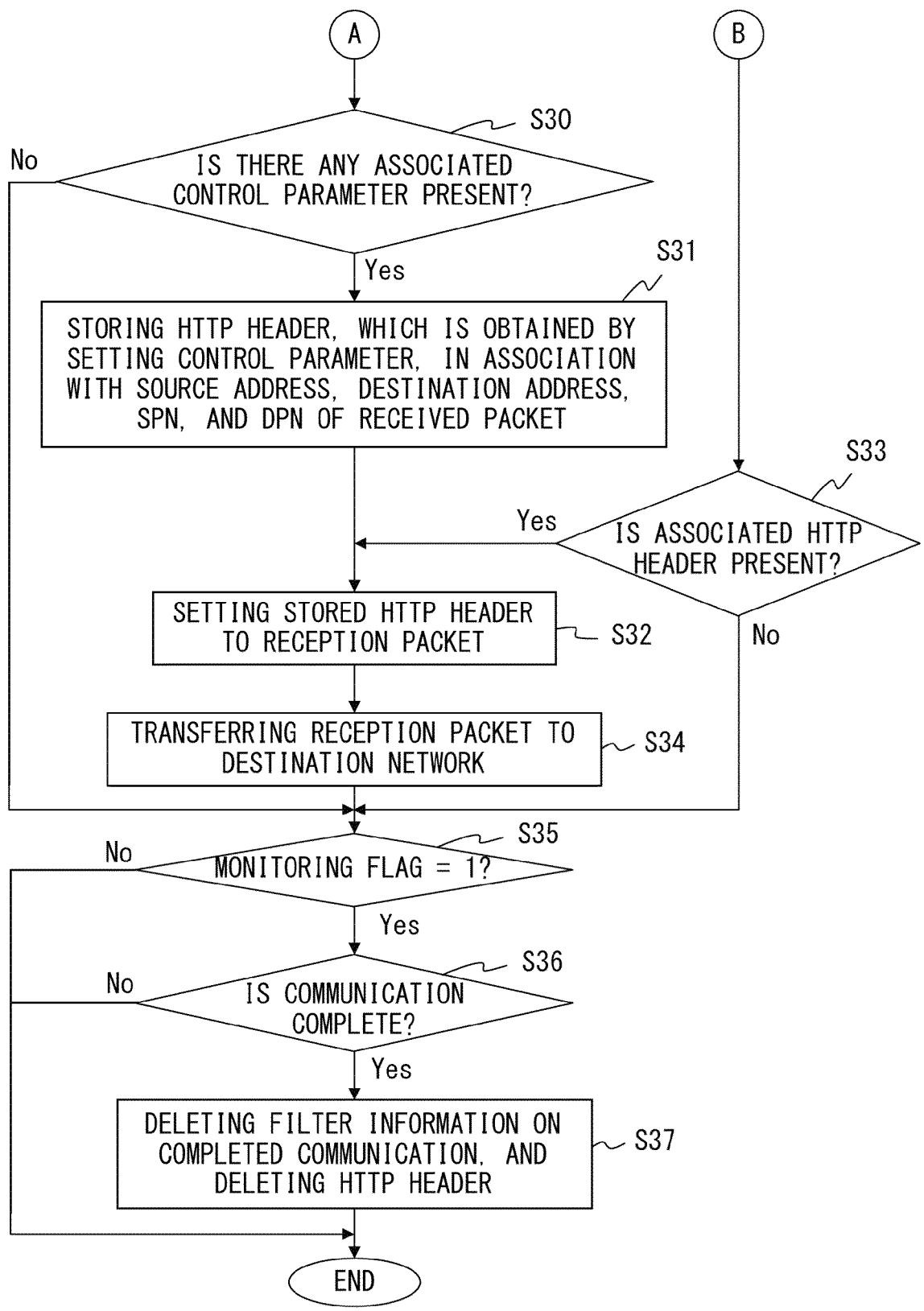

FIGS. 12A and 12B are flowcharts in which an example of the operation of a QoS control device 10 according to the Second Embodiment is illustrated. In the example of FIG. 12, the process of recording and deleting the filter information is performed for each connection, and the order of procedures (1a) and (2a) is changed. In the QoS control device 10 that performs the procedures depicted in FIGS. 12A and 12B, a monitoring flag is used. The monitoring flag indicates whether the filter information obtaining unit 12 is monitoring the termination of the communication, and when the monitoring flag is "1", it indicates that the termination of the communication is being monitored. In other words, the termination of the communication is detected while the monitoring flag indicates "1". It is assumed that one monitoring flag is set for each piece of the filter information. In the descriptions of FIGS. 12A and 12B, the monitoring flag is included in the filter information database 21; however, where the monitoring flag is stored may be changed.

Once a packet is received through the interface 11, the filter information obtaining unit 12 obtains a source address, a destination address, a source port number, and a destination port number of the received packet (steps S21, S22). The processes of steps S23-S25 are similar to steps S3-S5 described above with reference to FIG. 9. Note that in step S25, the filter information database 21 is generated as depicted in FIG. 3B.

Furthermore, the filter information obtaining unit 12 checks whether the connection is set to be terminated after the data is transferred with reference to a value in the connection field of the HTTP header 41 (step S26). When the connection is set to be terminated, the filter information obtaining unit 12 sets the monitoring flag of the filter information database 21 to "1" (step S27). When the monitoring flag is set to "1", the filter information obtaining unit 12 stores a value of a "FIN" bit in the TCP header 53 of a packet that is to be output to the parameter setting unit 13. On the other hand, when the connection is not set to be terminated, the filter information obtaining unit 12 sets the monitoring flag to "0" (step S28). The processes of steps S29-S30 are similar to steps S6-S7 of FIG. 9. When a control parameter that is associated with a destination address or the like is not present in the policy information database 22, the parameter setting unit 13 transfers a reception packet to a destination network (step S30). On the other hand, when an associated control parameter is present, the parameter setting unit 13 stores an HTTP header which is obtained by setting a control parameter to the HTTP header 41 of the received packet, so as to be associated with a destination address or the like (steps S30, S31). In other words, the parameter setting unit 13 stores the HTTP header 41 as depicted in FIG. 11B. Next, the parameter setting unit 13 sets a control parameter to the HTTP header 41 of a reception packet, and transfers the set packet to a destination network (steps S32, S34). If a packet is determined to not be the control packet 50 in step S23, the parameter setting unit 13 compares the packet with the information stored in the parameter setting unit 13 to check if any of the HTTP headers 41 are associated to the destination of the reception packet (step S33). Here, the information stored in the parameter setting unit 13 includes a destination address or the like. If a HTTP header 41 associated to the destination of the reception packet are stored in the parameter setting unit 13, the parameter setting unit 13 adds the stored HTTP header 41 to the reception packet (steps S32). Then, the parameter setting unit 13 transfers the reception packet to a destination network (steps S34). When a control parameter that is associated with a destination address or the like is not stored in the parameter setting unit 13, the parameter setting unit 13 transfers the reception packet to a destination network (steps S33, S34).

The parameter setting unit 13 checks a monitoring flag of the filter information database 21 (step S35). When the value of the monitoring flag is "1", the parameter setting unit 13 notifies the filter information obtaining unit 12 of the completion of the transfer of a packet, and the filter information obtaining unit 12 checks if the transfer of a packet in which the value of the "FIN" bit is "1" is complete (step S36). When it is confirmed that the transfer of a packet in which the value of the "FIN" bit is "1" is complete, the filter information obtaining unit 12 determines that the communication is complete, and deletes the filter information of the connection where the communication is complete. Moreover, the parameter setting unit 13 deletes from the stored HTTP headers an HTTP header or the like that was used for the connection where the communication is complete (step S37).

As described above, in the Second Embodiment, the filter information that is depicted in FIG. 3B is used. For this reason, the parameter setting unit 13 also checks a destination port number and a source port number when checking if there are any control parameters to be set. Accordingly, in the Second Embodiment, the communication quality may be managed for every connection.

Moreover, in the QoS control device 10 according to the Second embodiment, the filter information obtaining unit 12 manages the filter information of the upstream direction in association with the filter information of the downstream direction. The filter information obtaining unit 12 uses the HTTP header 41 to monitor whether the communication is continuously maintained between the terminal X and the server Y. By so doing, the filter information obtaining unit 12 may delete from the filter information database 21 the filter information of the connection where the communication is completed. Accordingly, in the QoS control device 10 according to the Second embodiment, the data that is related to the connection where the communication is completed is autonomously deleted from the filter information database 21, thereby realizing QoS control even in devices where the capacity of the memory 20 is small.

Third Embodiment

In the First and Second Embodiments, the filter information that is obtained by the filter information obtaining unit 12 is recorded in the filter information database 21. However, an operator may register in the filter information database 21 in advance the filter information of the data packet 60 to be controlled. In this case, the filter information obtaining unit 12 obtains filter information from the input control packet 50, and compares the obtained filter information with what is registered in the filter information database 21. When the filter information obtained from the control packet 50 is registered in the filter information database 21, the filter information obtaining unit 12 notifies the parameter setting unit 13 and the network identification unit 14 of the fact that the control packet 50 is to be processed. Once notification is made of the fact that the control packet 50 is to be processed, the parameter setting unit 13 and the network identification unit 14 operate as described above in the First and Second Embodiments, respectively.

The present embodiment may be utilized for controlling the communication quality of data that is obtained by one of the computers included in one subnet. For example, as depicted below, a network address may be registered in the destination address or source address of the filter information database 21.

destination address: 10.11.12.0/24
    source address: 10.11.14.0/24
    protocol: TCP
    media type: jpeg image As described above, when a network address is registered in the filter information, the filter information obtaining unit 12 interprets this to mean that a computer included in a subnet designated by the registered network address is specified. Accordingly, the parameter setting unit 13 processes, for example, the filter information of the control packet 50 as depicted below, and thereby the communication quality of the data packet 60 is managed.

destination address: 10.11.12.13/24
    source address: 10.11.14.15/24
    protocol: TCP
    media type: jpeg image Moreover, the Third embodiment may be adapted for cases in which the filter information obtaining unit 12 is unable to identify a port number, a media type, or the like due to an encrypted communication such as the Security Architecture for Internet Protocol (IPSec) and the Secure Socket Layer (SSL). For example, when an operator knows in advance the source address and destination address of user data for which the quality is to be managed, the operator registers the source address and the destination address in the filter information database 21. Moreover, a protocol and a media type whose quality is to be managed are designated to "ANY", and thus any type of data may be designated for an object to be processed. In this case, the filter information obtaining unit 12 compares the source address and destination address of the obtained packet with the data of the filter information database 21. The QoS control device 10 recognizes a packet in which the source address and destination address match the data of the filter information database 21 as an object whose quality is to be managed, and as described in the First Embodiment, marks a header that is processed in the network layer or a layer lower than the network layer. If two or more control parameters are set to the policy information database 22 in accordance with the media types as depicted in FIG. 4, a parameter selecting method for cases of the media type being "ANY" may be set to the parameter setting unit 13 in advance. Alternatively, a control parameter for cases of the media type being "ANY" may be recorded in the policy information database 22.

Furthermore, the Third embodiment may be adapted for cases in which a protocol that is not supported by the filter information obtaining unit 12 is used in the communication. For example, there are cases in which a protocol of a higher-order layer that is arranged higher than a transport layer used for the communication cannot be processed by the filter information obtaining unit 12, but the filter information obtaining unit 12 may obtain the IP source address and the IP destination address. In such cases, the filter information obtaining unit 12 obtains the IP source address and the IP destination address to compare them with the data included in the filter information database 21, and notifies the parameter setting unit 13 and the network identification unit 14 of a comparison result. If the filter information is registered in the filter information database 21, the communication quality of the data packet 60 is controlled by the above-described operations of the parameter setting unit 13 and the network identification unit 14.

Modification

In the Second Embodiment, cases in which TCP and HTTP are used for a network layer and an application layer, respectively, in the communication are described. However, even if other protocols are used, the method for generating filter information according to the Second Embodiment may be used in a similar manner.

An example of the operations will be described in which the filter information obtaining unit 12 obtains the filter information from the third control packet, which is generated by using RTP and SIP at a network layer and an application layer, respectively.

Firstly, the filter information obtaining unit 12 obtains the source address and the destination address from the IP header 52 of the received packet. Next, the filter information obtaining unit 12 obtains a port number by referring to a UDP header in the payload. The format of a UDP header is depicted in FIG. 10B. A UDP header includes a source port number, a destination port number, a segment size, and a checksum.

In procedure (2a), the filter information obtaining unit 12 obtains source port number "30000" from the first 16 bits of a UDP header, and obtains destination port number "20000" from the next 16 bits.

In procedure (3a), the filter information obtaining unit 12 stores a source address, a destination address, a destination port number, a protocol, and a media type in the filter information database 21. Here, the filter information obtaining unit 12 records "ANY" in the filter information database 21 without recording the source port number obtained from the UDP header. In other words, it is registered that the source port number may be any number. Here, it is assumed that the filter information of No. 1 of FIG. 3B is registered.

In procedure (5a), the filter information obtaining unit 12 registers the filter information of the fourth control packet, which is transmitted from the server Y to the terminal X in response to the third control packet, as depicted in No. 2 of FIG. 3B. At this time, the filter information obtaining unit 12 designates the source port number of the third control packet to the destination port number of the fourth control packet. Also, in the filter information of the fourth control packet, the filter information obtaining unit 12 designates the source port number to "ANY".

Furthermore, the filter information obtaining unit 12 recognizes the media type by analyzing an SIP message included in the payload of the third control packet. The filter information obtaining unit 12 recognizes a media type in the Session Description Protocol (SDP) information, which is included in a message used in an SIP. A message that is used in an SIP includes, for example, a request message such as an INVITE message, a response message such as a "200OK" response, and an ACK message. For example, it is described that "m=audio 49170 RTP/AVP 0" in m-th row of the SDP information. The filter information obtaining unit 12 recognizes that voice data is transmitted and received through the established connection according to the description "audio" in the m-th row. In cases where information other than a media type such as a source address or a port number can be obtained from the SDP information, the filter information obtaining unit 12 may obtain these pieces of information from the SDP information.

After the filter information is obtained, similar process to procedures (11)-(17) described in the First Embodiment or as in steps S6-S10 of FIG. 9 are performed. At that time, in the present modification, the filter information database 21 as depicted in FIG. 3B is generated. Then, for example, in step S8, the parameter setting unit 13 stores a control parameter so as to be associated not only with a destination address and a source address but also with a destination port number and a source port number. In step S10, the parameter setting unit 13 obtains a control parameter to be set to the data packet 60 in comparison with the destination address, source address, destination port number, and source port number of the data packet 60.

Other

Note that the present invention is not limited to the embodiments described above, but may be modified in various ways. Some examples of such modification will be described below.

In the First and Second Embodiments, cases in which the filter information obtaining unit 12 stores the obtained filter information in the filter information database 21 are described. However, this was for the purpose of enhancing understanding. In fact, the filter information obtaining unit 12 may output the obtained filter information to the parameter setting unit 13 or to the network identification unit 14. In such cases, the parameter setting unit 13 and the network identification unit 14 perform processing on the basis of the filter information input from the filter information obtaining unit 12 without referring to the filter information database 21.

Moreover, any two or more embodiments that include the First to Third Embodiments may be combined. If the Third Embodiment is combined with the First or Second Embodiment, there are some cases in which the filter information obtaining unit 12 are set to refer to the filter information registered by an operator when a portion of the filter information cannot be extracted.

Furthermore, information elements that are included in the filter information database 21 or the policy information database 22 may be changed depending on the implementation. For example, depending on the capacity of the memory 20 of the QoS control device 10, the policy information database 22 may be divided into two or more databases and stored. The databases that are depicted in FIG. 3 and FIG. 4 are given as an example, and the filter information database 21 or the policy information database 22 may be configured, for example, as a hash table. When the filter information database 21 of FIG. 3B is a hash table, a search key such as "Index (Filter Table)=hash ("SA:SPN:DA:DPN:media type")" may be used.

In the embodiments described above, cases in which the QoS control device 10 functions as a relay device such as a router or a gateway were described in detail. However, the QoS control device 10 may be configured as an adapter of a relay device such as a router or a gateway.

The parameter setting unit 13 may be configured to include the filter information obtaining unit 12 and the network identification unit 14. Alternatively, the parameter setting unit 13 may be configured to include one of the filter information obtaining unit 12 and the network identification unit 14, or the network identification unit 14 may be included in the filter information obtaining unit 12 as a modification.

A part of or all of the filter information obtaining unit 12, the parameter setting unit 13, and the network identification unit 14 may be realized by software. If the filter information obtaining unit 12, the parameter setting unit 13, and the network identification unit 14 are realized by software, the QoS control device 10 includes the interface 11, the memory 20, and a Central Processing Unit (CPU). The memory 20 stores a program (not illustrated). The program includes a filter information obtaining module, a parameter setting module, and a network identification module. The CPU executes a program to realize a filter information obtaining function, a parameter setting function, and a network identification function. Note that the operations that are realized by these function are similar to those of the filter information obtaining unit 12, the parameter setting unit 13, or the network identification unit 14, which are described in the embodiments above.

The communication quality may be managed as in the network operated with the guarantee system even if a packet is not configured to support a parameter or the like used for controlling the communication quality.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay device which relays a packet which is transmitted from a first network to a second network, the relay device comprising:
a receiver to receive the packet from the first network;
an information obtaining unit to obtain data type information for identifying a type of data which is transmitted and received by the packet;
a parameter storage unit to store a control parameter which is used for controlling communication quality in the second network, so as to be associated with a type of transfer data indicating data transferred to the second network; and
a parameter setting unit to set to the packet the control parameter which is associated with transfer data of a same type as data identified by the data type information, and to output the packet to which the control parameter is set to the second network.

2. The relay device according to claim 1, further comprising
a network identification unit to identify a network to which the packet is transferred by using a destination address of the packet, and to output a destination identifier for identifying the network to which the packet is transferred to the parameter setting unit,
wherein
the information obtaining unit further obtains the destination address of the packet,
the parameter storage unit stores the control parameter which is used for controlling communication quality in the second network, so as to be associated with an identifier for identifying the second network, and stores a control parameter which is used for controlling communication quality in a third network connected with the relay device, so as to be associated with an identifier for identifying the third network, and
the parameter setting unit sets to the packet the control parameter which is associated with transfer data of a same type as data identified by the data type information, selected from the control parameter which is used for controlling a network corresponding to the destination identifier obtained from the network identification unit.

3. The relay device according to claim 1, wherein
the information obtaining unit obtains the data type information from a control packet including the data type information,
the parameter setting unit sets to the control packet a setting parameter which represents the control parameter associated with a type of data identified by the data type information, and outputs the control packet to the second network, the parameter setting unit further stores the setting parameter so as to be associated with a destination address and a source address of the control packet, when a packet received by the receiver is a data packet that does not include the data type information, the information obtaining unit obtains a destination address and a source address of the data packet, and when a destination address and a source address of the data packet match a destination address and a source address of the control packet, the parameter setting unit sets the setting parameter to the data packet, and outputs the data packet to the second network.

4. The relay device according to claim 3, wherein the information obtaining unit further obtains the source address of the control packet, the destination address of the control packet, a source port number of the control packet, and a destination port number of the control packet, the parameter setting unit stores the setting parameter so as to be associated with combination information which indicates a combination of the destination address, the source address, the source port number, and the destination port number of the control packet, and when a communication using the combination information is completed, the parameter setting unit deletes the combination information and the setting parameter of the completed communication.

5. The relay device according to claim 3, wherein the parameter storage unit classifies the transfer packet by type by using a type of data included in a transfer packet and a type of protocol used for processing the transfer packet, the information obtaining unit specifies a type of data included in the data packet using data type information included in the control packet, and specifies a protocol used for processing the data packet as a same protocol as a protocol for processing the control packet, and the parameter setting unit sets to the data packet the control parameter which is associated with the transfer packet of the specified type of data and type of protocol.

6. A relay device which relays a relay packet which is transmitted from a first network to a second network, the relay device comprising:

a receiver to receive the relay packet from the first network;

an information obtaining unit to obtain data type information for identifying a type of data which is transmitted and received by the relay packet and address information which indicates a destination address and a source address of the relay packet;

an object information storage unit to store a combination of a destination address and a source address of an object packet in which communication quality is controlled by the second network;

a parameter storage unit to store the control parameter which is used for controlling communication quality in the second network, so as to be associated with a type of transfer data indicating data transferred to the second network; and a parameter setting unit to set the control parameter which is associated with transfer data of a same type as data identified by the data type information, to the relay packet when a combination matching the address information is stored in the object information storage unit, and to output the relay packet to which the control parameter is set to the second network.

7. A non-transitory storage medium storing a program for causing a relay device, which relays a packet which is transmitted from a first network to a second network, to execute a process comprising:

receiving the packet from the first network;

obtaining data type information for identifying a type of data which is transmitted and received by the packet;

storing a control parameter which is used for controlling communication quality in the second network, so as to be associated with a type of transfer data indicating data transferred to the second network; and setting to the packet the control parameter which is associated with transfer data of a same type as data identified by the data type information, and outputting the packet to which the control parameter is set to the second network.

* * * * *